United States Patent [19]

Noll

[11] Patent Number: 5,404,670
[45] Date of Patent: Apr. 11, 1995

[54] SURVIVAL GEAR STORAGE AND FISHING APPARATUS

[76] Inventor: Rodney G. Noll, 3314 Mueller Rd., DeForest, Wis. 53532

[21] Appl. No.: 257,502

[22] Filed: May 3, 1994

[51] Int. Cl.⁶ .............................................. A01K 97/00
[52] U.S. Cl. ..................................... 43/54.1; 242/905; 242/405.1
[58] Field of Search ...................... 43/54.1, 4; 242/905, 242/405.1, 405.2; 224/257, 922; 206/315.11, 579, 227

[56] References Cited

U.S. PATENT DOCUMENTS

| | | | |
|---|---|---|---|
| 378,928 | 3/1888 | Goldsmith | 43/54.1 |
| 821,579 | 5/1906 | Austen | 43/54.1 |
| 1,903,798 | 4/1933 | Turner | 224/922 |
| 2,473,977 | 6/1949 | Tutton | 224/922 |
| 2,650,041 | 8/1953 | Albers | 242/405.2 |
| 3,154,063 | 10/1964 | White | 43/54.1 |
| 3,179,351 | 4/1965 | Ehlert | 43/54.1 |
| 3,302,320 | 2/1967 | Breeden | 242/905 |
| 4,082,235 | 4/1978 | Dauvergne | 242/84.25 |
| 4,200,249 | 4/1980 | Synstelien et al. | 242/96 |
| 4,803,797 | 2/1989 | Barham | 43/18.1 |
| 5,092,075 | 3/1992 | Campos | 43/54.1 |

*Primary Examiner*—Kurt Rowan
*Attorney, Agent, or Firm*—David L. Baker; Rhodes & Ascoullo

[57] ABSTRACT

A survival gear storage and fishing apparatus has a tapered reel shaft having a reduced diameter center portion. A first housing is connected to one end of the reel shaft and a second housing is connected to another end of the reel shaft. The second housing is linearly aligned with the first housing and the reel shaft. An anvil and securement shaft port is located in the reduced diameter center portion of the reel shaft. An anvil and securement shaft is located in the anvil and securement shaft port. There is a first tubular storage chamber in the first housing and a second tubular storage chamber in the second housing. A first cap is threadingly secured to a first open end of the first housing. The first cap has a first knurled outer surface. A second cap is threadingly secured to a second open end of the second housing and the second cap has a second knurled outer surface. A wire saw blade may attached to a loop on an outside surface of the first cap and second cap. There is a first knurled surface on an outer surface of the first housing and a second knurled surface on an outer surface of the second housing. There is also a carrying case enclosing the survival gear storage and fishing apparatus. The carrying case has an adjustable and removable carrying strap, a belt loop and a resealable pocket.

4 Claims, 4 Drawing Sheets

SURVIVAL GEAR STORAGE AND FISHING APPARATUS

BACKGROUND OF THE INVENTION

1. Field of the Invention

This invention relates to a fishing apparatus and an apparatus for storing survival gear.

2. Description of the Related Art

Various devices have been offered to the public to enhance their chances of survival if by unfortunate circumstance they find themselves in a primitive environment. Since the ability to catch fish if they are available is life enhancing, some of the devices provide a way to catch fish. However, these previous devices do little to help the user in other life-threatening situations encountered in the wild.

U.S. Pat. No. 4,082,235 to H. A. Dauvergne on Apr. 04, 1978 for a Poleless Fishing Rig describes disk-like fishing rig having inner compartments to store fishing equipment and a snap-on lid to contain the equipment.

U.S. Pat. No. 4,200,249 to F. L. Synstelien on Apr. 29, 1980 for a Storage Device shows a reel-type storage device having a friction strap or brake to bear against the winding surface and several compartments therein to store small fishing components.

U.S. Pat. No. 4,803,797 to R. D. Barham on Feb. 14, 1989 for a Compact Fishing Device describes a spool with fishing line wrapped thereon. The spool having a handle to allow releasing and locking of the line on the spool. A tube may be releasably attached to the handle and used to secure the handle to the ground.

U.S. Pat. No. 5,092,075 to J. M. Campos on Mar. 03, 1992 for a Storage Device for Use in Emergencies or as a Combination Hand Caster Including Fishing Reel, Tackle Storage Box and Flashlight Storage Handle shows a multi-compartment housing for storage of fishing items, a light and some survival gear.

The present invention solves the problem often encountered by a person finding themselves in a difficult situation in a remote area when other needs need to be addressed to stay alive other than making it easier to fish.

SUMMARY OF THE INVENTION

The present invention is designed to compactly contain an assortment of basic life-saving articles in two separate chambers. The invention also supplies a anvil and securement shaft securely placed between the two chambers that may be used as a shaft to secure the fishing line or as an anvil to make holes in hides of animals or other material should leather or other material for clothing need to be assembled in a manner requiring holes for connection by the threading of hide thongs or other securing material. Tearing or cutting a hole leaves a ragged hole easily ripped when placed under stress. A round hole provides a more durable mode of attachment.

The outer surfaces of the two housings and the end caps have knurled surfaces to provide the user with a more positive grip. Slippery surfaces are frustrating and dangerous in many situations. When the fishing line is secured to the center shaft and anvil, the fishing line may be reeled in by wrapping the line about the center shaft and the two housings. The end caps have a retaining loop to attach a wire saw. This saw, when firmly affixed, allows the user to cut through many surfaces and items because of the ability to use the leverage of the apparatus.

Items that may be placed within the two chambers are fishing lines, hooks, sinkers, a bobber, lures, a knife blade, an awl, a punch, wire saw and a can and bottle opener. Other items may include matches, a striking surface, bandages, antiseptic cream, a razor blade, salt tablets, a length of nylon rope, a solar blanket, safety pins, a pair of tweezers and a compass. The selection of the items is left to the discretion of the user. A handy carrying case is provided that may be attached to the belt of the user or, by using a shoulder strap, slung over the user's shoulder or back and conveniently and comfortably carried in that manner. The carrying case has a handy pocket to store the shoulder strap or additional items when the strap is not being used.

In an aspect of the present invention, a survival gear storage and fishing apparatus is described that has a reel shaft and a first housing connected to one end of the reel shaft. There is a second housing connected to another end of the reel shaft. There is an anvil and securement shaft port in the reel shaft. An anvil and securement shaft is in the anvil and securement shaft port. There is a first storage chamber in the first housing and a second storage chamber in the second housing. A first cap is releasably secured to a first open end of the first housing and a second cap is releasably secured to a second open end of the second housing. There is a first knurled surface on an outer surface of the first housing and a second knurled surface on an outer surface of the second housing.

There also may be a carrying case enclosing the survival gear storage and fishing apparatus. The carrying case has an adjustable and removable carrying strap on the carrying case. There is also a belt loop and a resealable pocket on the carrying case.

It is an object of this invention to provide a survival gear storage and fishing apparatus that will enable the user to enhance his or her chances of surviving a difficult primitive environment by allowing the user to have readily on hand a compact kit of tools encased in a container and carrying case easily kept on the person.

DESCRIPTION OF THE PREFERRED EMBODIMENT

Figure 1:
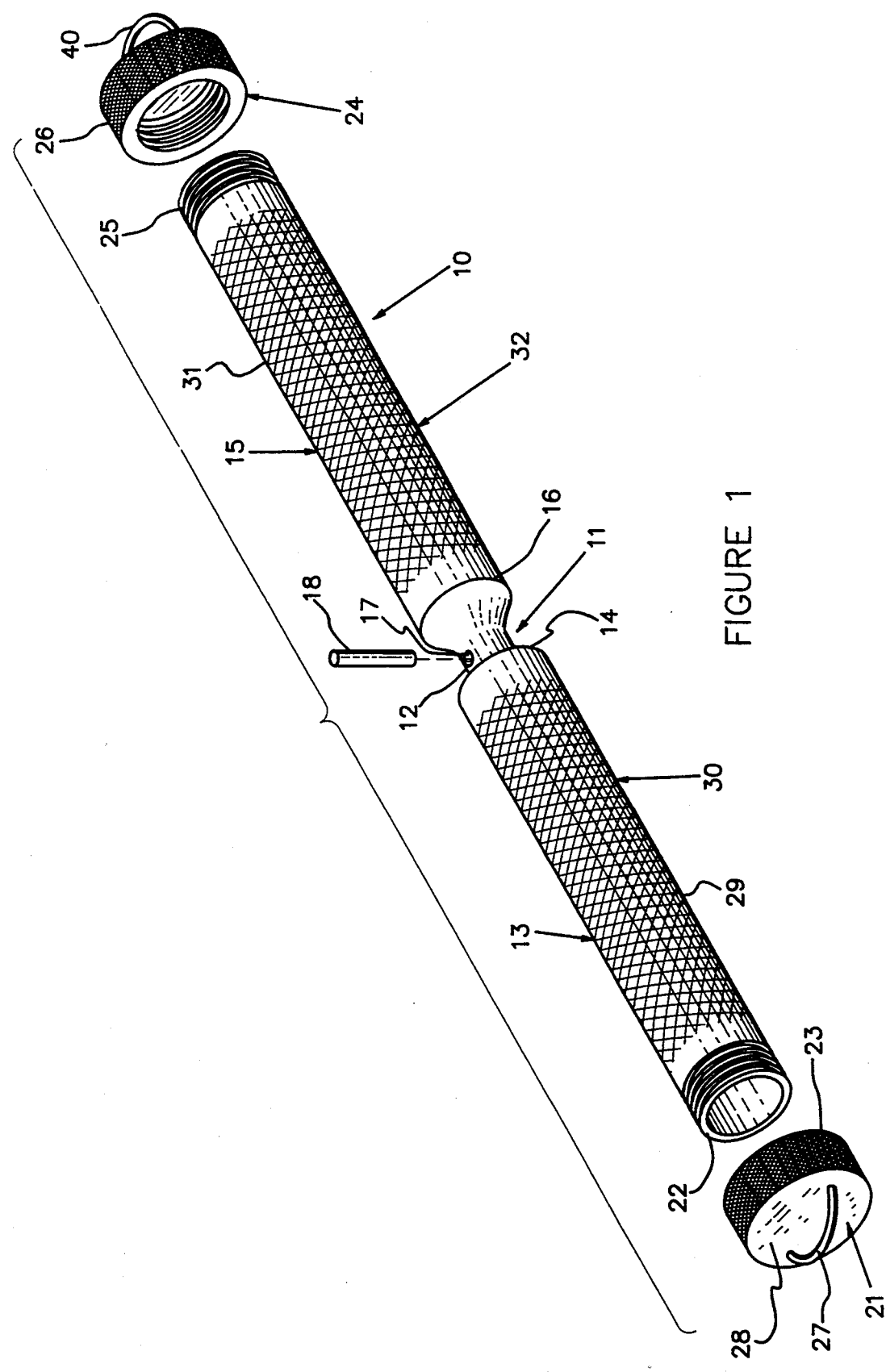
FIG. 1 is an exploded perspective view of the Survival Gear Storage and Fishing Apparatus.
Figure 2:
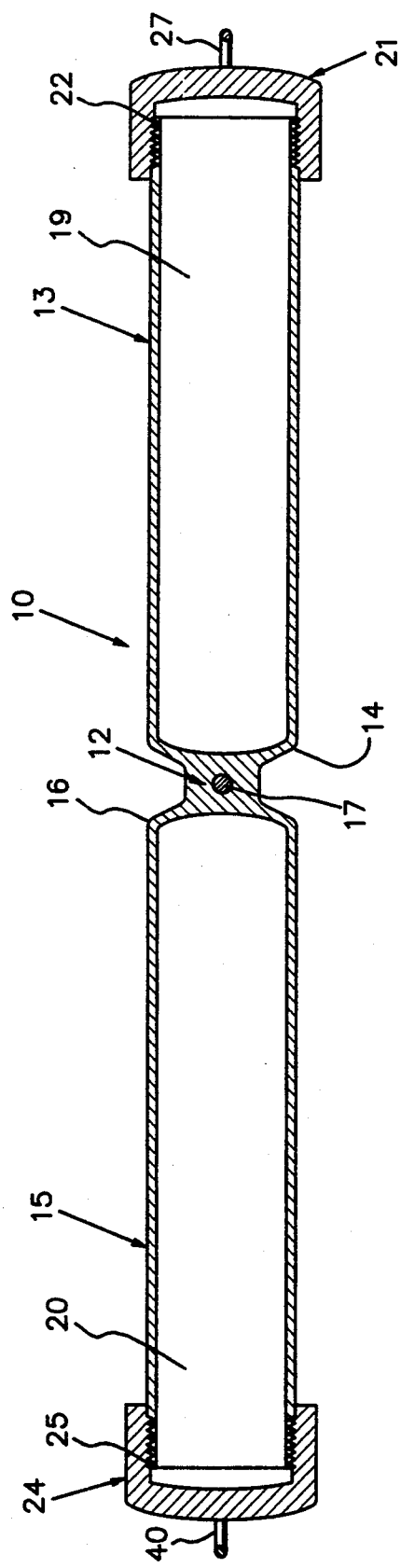
FIG. 2 is a cross-sectional view along line 2—2 of FIG. 3.
Figure 3:
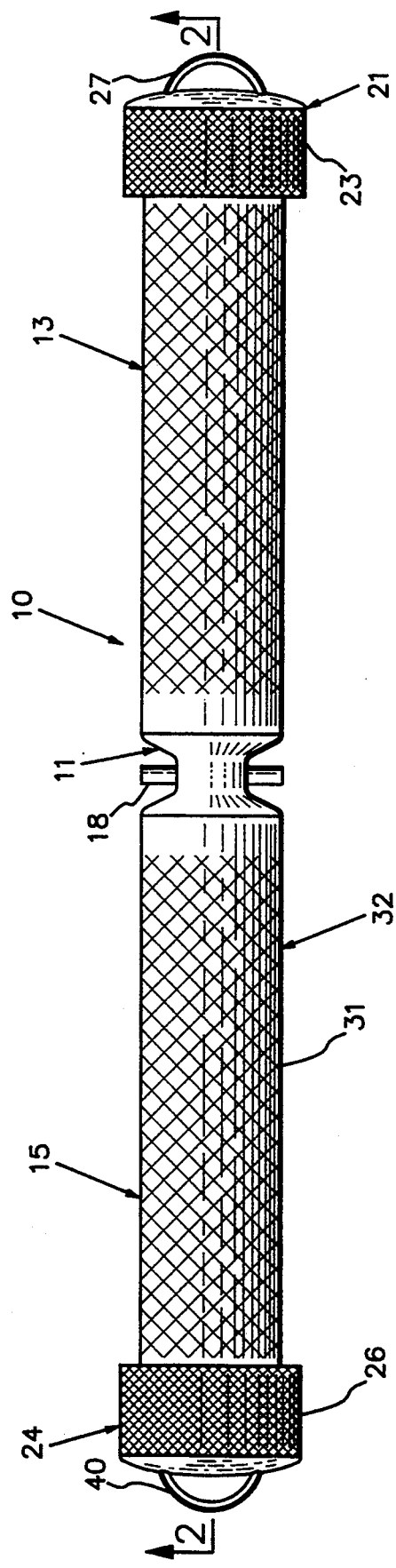
FIG. 3 is a front elevational view.
Figure 4:
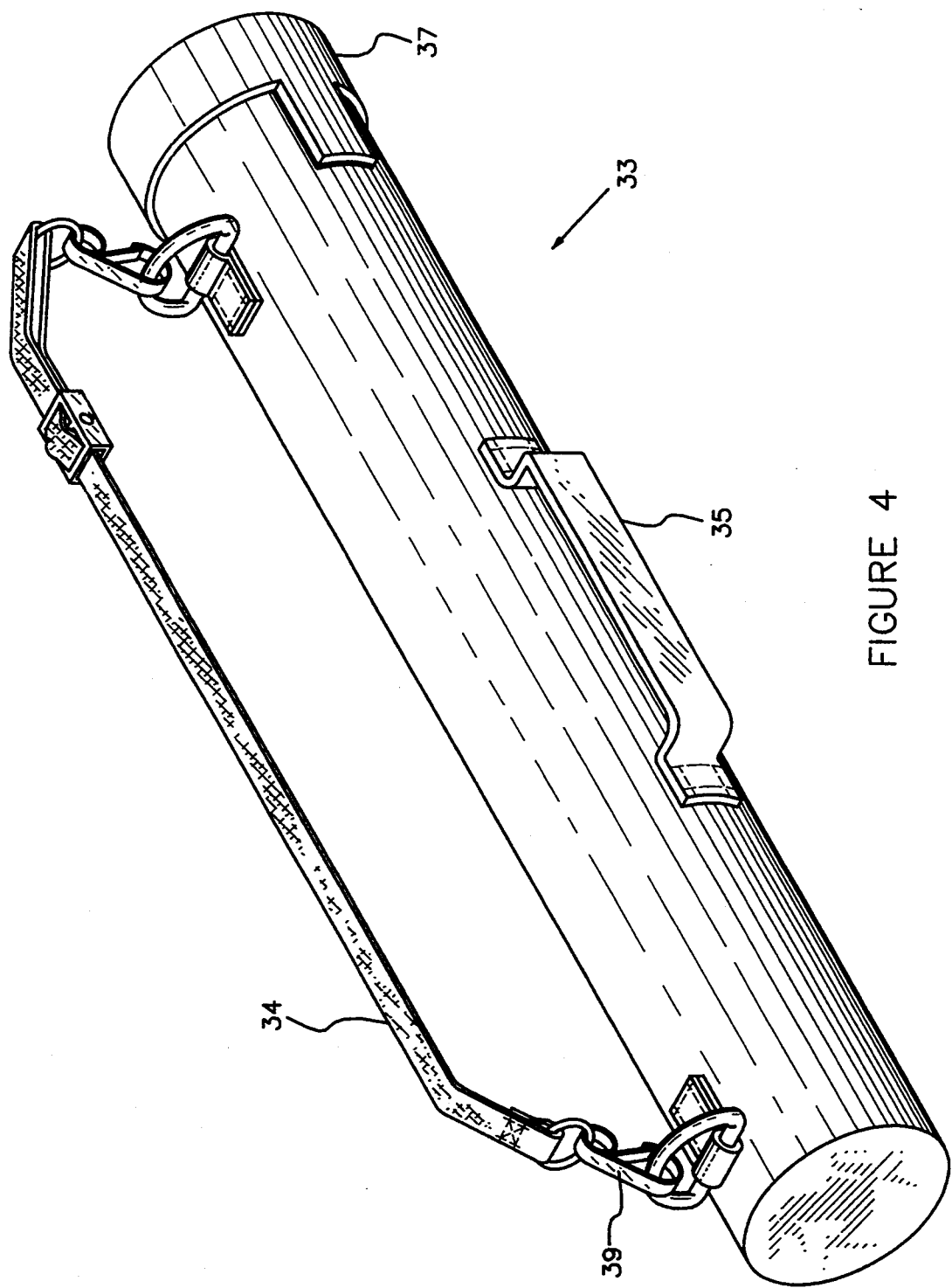
FIG. 4 is a perspective view of the carrying case for the Survival Gear Storage and Fishing Apparatus.
Figure 5:
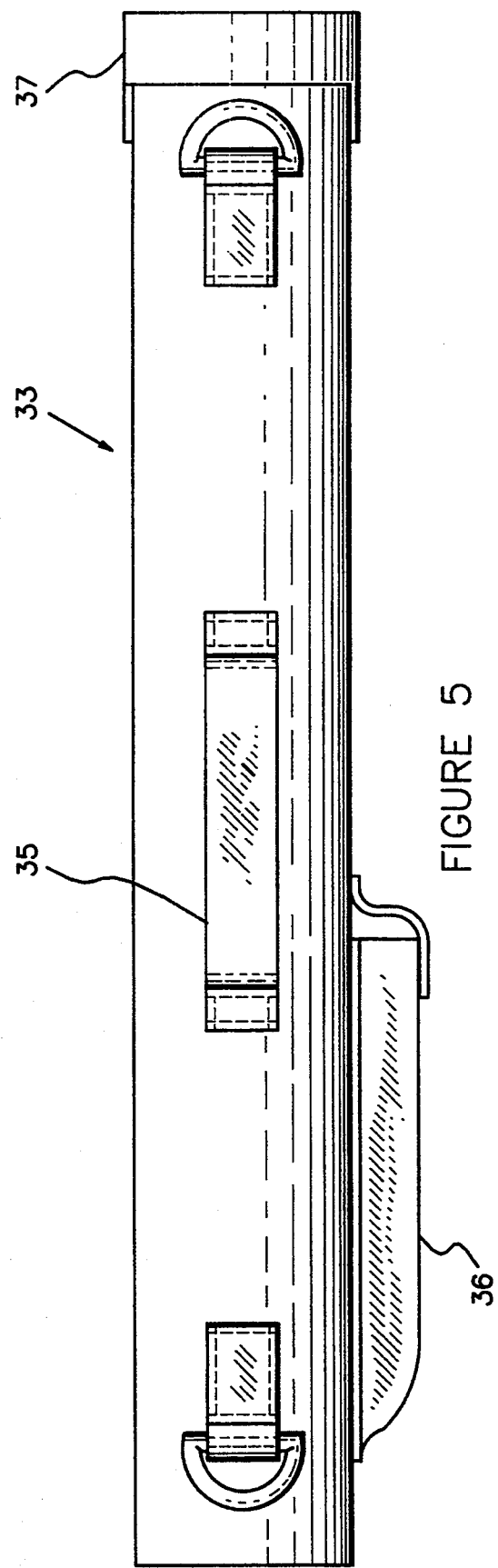
FIG. 5 is a top plan view of the carrying case for the Survival Gear Storage and Fishing Apparatus.
Figure 6:
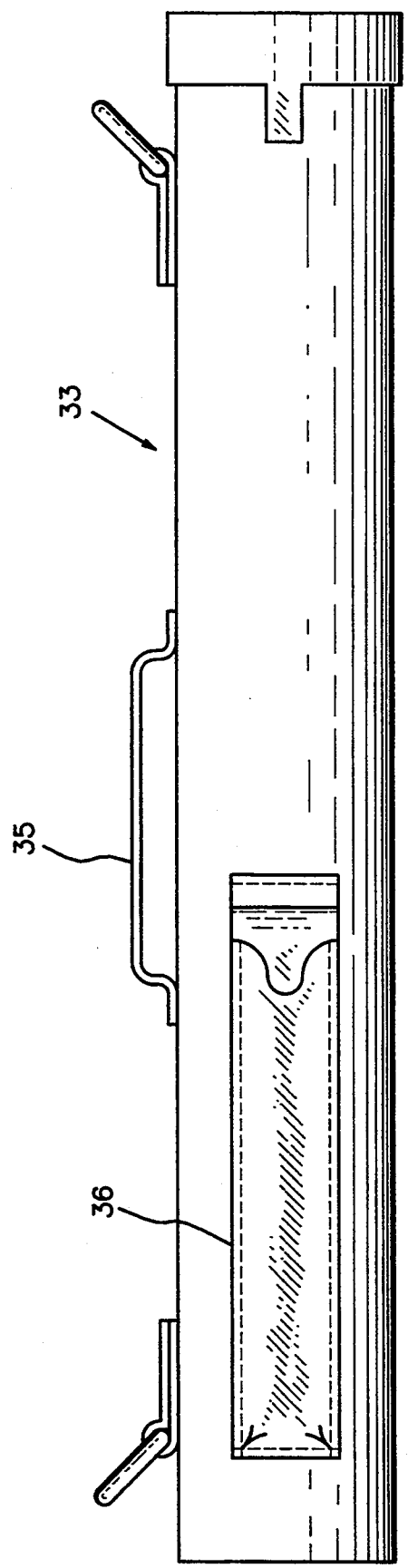
FIG. 6 is a front elevational view of the carrying case for the Survival Gear Storage and Fishing Apparatus.

Referring to FIGS. 1 through 6, a survival gear storage and fishing apparatus 10 is shown and described that has a tapered reel shaft 11 having a reduced diameter center portion 12. There is a first housing 13 connected to one end 14 of the reel shaft 11 and a second housing 15 connected to another end 16 of the reel shaft 11. The second housing 15 is linearly aligned with the first housing 13 and the reel shaft 11. There is an anvil and securement shaft port 17 in the reduced diameter center portion 12 of the reel shaft 11. An anvil and securement shaft 18 is removably placed in the anvil and securement shaft port 17. There is a first tubular storage chamber 19 in the first housing 13 and a second tubular storage chamber 20 in the second housing 15. A first cap 21 is threadingly secured to a first open end 22 of the first housing 13. The first cap 21 has a first knurled outer surface 23. A second cap 24 is threadingly secured to a second open end 25 of the second housing 15 and the second cap 24 has a second knurled outer surface 26. A wire saw blade attachment loop 27 is attached to an outside surface 28 of the first cap 21 to which a wire saw may be attached. A second wire saw blade attachment loop 40 is attached to an outside surface 41 of the second cap 24 to which a wire saw may be attached. There is a first knurled surface 29 on an outer surface 30 of the first housing 13 and a second knurled surface 31 on an outer surface 32 of the second housing 15. There is also a carrying case 33 enclosing the survival gear storage and fishing apparatus 10. The carrying case 33 has an adjustable and removable carrying strap 34, a belt loop 35 and a resealable pocket 36. The carrying case 33 has a cap 37. the carrying strap 34 has spring clips 38 which releasably attach to D-rings 39.

The foregoing descriptions and drawings of the invention are explanatory and illustrative only, and various changes in shape, sizes and arrangements of parts as well certain details of the illustrated construction may be made within the scope of the appended claims without departing from the true spirit of the invention.

I claim:

1. A survival gear storage and fishing apparatus comprising:
    (a) a reel shaft;
    (b) a first housing connected to one end of the reel shaft;
    (c) a second housing connected to another end of the reel shaft;
    (d) an anvil and securement shaft port in the reel shaft;
    (e) an anvil and securement shaft in the anvil and securement shaft port;
    (f) a first storage chamber in the first housing;
    (g) a second storage chamber in the second housing;
    (h) a first cap releasably secured to a first open end of the first housing;
    (i) a second cap releasably secured to a second open end of the second housing;
    (j) a first knurled surface on an outer surface of the first housing; and
    (k) a second knurled surface on an outer surface of the second housing.

2. A survival gear storage and fishing apparatus as described in claim 1 further comprising:
    (a) a carrying case enclosing the survival gear storage and fishing apparatus;
    (b) an adjustable and removable carrying strap on the carrying case;
    (c) a belt loop on the carrying case; and
    (d) a resealable pocket on the carrying case.

3. A survival gear storage and fishing apparatus comprising:
    (a) a tapered reel shaft having a reduced diameter center portion;
    (b) a first housing connected to one end of the reel shaft;
    (c) a second housing connected to another end of the reel shaft and linearly aligned with the first housing and the reel shaft;
    (d) an anvil and securement shaft port in the reduced diameter center portion of the reel shaft;
    (e) an anvil and securement shaft in the anvil and securement shaft port;
    (f) a first tubular storage chamber in the first housing;
    (g) a second tubular storage chamber in the second housing;
    (h) a first cap, threadingly secured to a first open end of the first housing, having a first knurled outer surface;
    (i) a second cap, threadingly secured to a second open end of the second housing, having a second knurled outer surface;
    (j) a first wire saw blade attachment loop connected to an outside surface of the first cap;
    (k) a second wire saw blade attachment loop connected to an outside surface of the second cap;
    (l) a first knurled surface on an outer surface of the first housing; and
    (m) a second knurled surface on an outer surface of the second housing.

4. A survival gear storage and fishing apparatus as described in claim 3 further comprising:
    (a) a carrying case enclosing the survival gear storage and fishing apparatus;
    (b) an adjustable and removable carrying strap on the carrying case;
    (c) a belt loop on the carrying case; and
    (d) a resealable pocket on the carrying case.

* * * * *